US011481593B2

(12) United States Patent
Chatterjee (10) Patent No.: US 11,481,593 B2
(45) Date of Patent: Oct. 25, 2022

(54) COLOR CHANGING STORAGE DEVICE HOUSING

(71) Applicant: Western Digital Technologies, Inc., San Jose, CA (US)

(72) Inventor: Anupam Chatterjee, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 194 days.

(21) Appl. No.: 16/908,642

(22) Filed: Jun. 22, 2020

(65) Prior Publication Data

US 2021/0397917 A1   Dec. 23, 2021

(51) Int. Cl.
  *G06F 3/06* (2006.01)
  *G06K 19/077* (2006.01)
  *G02F 1/15* (2019.01)
  *G02F 1/1514* (2019.01)

(52) U.S. Cl.
  CPC ......... *G06K 19/07707* (2013.01); *G02F 1/15* (2013.01); *G06F 3/0653* (2013.01); *G06F 3/0658* (2013.01); *G06F 3/0679* (2013.01); *G02F 1/1514* (2019.01)

(58) Field of Classification Search
  CPC .................... G06F 3/0658; G06K 19/07707
  See application file for complete search history.

(56) References Cited

U.S. PATENT DOCUMENTS

| 6,993,690 | B1* | 1/2006 | Okamoto | G11C 16/3418 |
| | | | | 365/185.33 |
| 7,818,531 | B2* | 10/2010 | Barrall | G06F 11/2069 |
| | | | | 714/48 |
| 8,156,303 | B2 | 4/2012 | Barrall | |
| 9,568,556 | B2 | 2/2017 | Bourilkov et al. | |
| 2014/0258895 | A1* | 9/2014 | Zhang | G06F 3/0484 |
| | | | | 715/762 |

(Continued)

FOREIGN PATENT DOCUMENTS

| CN | 107707430 A | 2/2018 |
| CN | 109246288 A | 1/2019 |

OTHER PUBLICATIONS

An IP.com Prior Art Database Technical Disclosure, "Capacity Usage Visualization Using a Heat Map", Jan. 31, 2012, IPCOM000214473D. (Year: 2012).*

(Continued)

*Primary Examiner* — Khoa D Doan
(74) *Attorney, Agent, or Firm* — Chang & Hale LLP (57) ABSTRACT

Systems and methods are disclosed for using a color changing surface to display a status of a storage device. In certain embodiments, a storage includes a display-less enclosure, non-volatile memory, memory configured to store firmware, and control circuitry. The control circuitry can be configured to determine an available space in the non-volatile memory, determine a first color corresponding to the available space based on a mapping of ranges of available space to corresponding colors, apply a voltage to the electrochromic material to change the color changing surface to the first color, and cease application of the voltage to the electrochromic material, wherein the color changing surface retains the first color after cessation of the voltage.

20 Claims, 5 Drawing Sheets

(56) References Cited

U.S. PATENT DOCUMENTS

2015/0187234 A1     7/2015   Atkinson et al.
2019/0036122 A1     1/2019   Iordache et al.

OTHER PUBLICATIONS

Yang, P., et al., "Electrochromic energy storage devices", Materials today, vol. 19, No. 7, pp. 394-402, (Sep. 30, 2016).
"Corsair Flash Readout Series," Web page <https://www.digitimes.com/photogallery/showphoto.asp?ID=1782>, Jan. 19, 2007.
Murphy, D.; "Corsair's Flash Redout USB 2.0 drive," Web page <https://www.engadget.com/2006-07-27-corsairs-flash-readout-usb-2-0-drive.htm>, Jun. 27, 2006.

\* cited by examiner

COLOR CHANGING STORAGE DEVICE HOUSING

BACKGROUND

Field

This disclosure relates to data storage devices. More particularly, the disclosure relates to devices and methods for indicating a status of the data storage devices.

Description of Related Art

Data storage devices provide access to data stored on the devices. Some storage devices provide status information to users by sending information to a host device for display on a screen or by using light emitting diodes (LEDs).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and devices described herein may be embodied in a variety of other forms. Furthermore, various omissions, substitutions and changes in the form of the methods and devices described herein may be made without departing from the scope of protection.

Overview

Disclosed herein are devices and methods for indicating a status of a storage device using a color changing surface (e.g., an electrochromic material) that is part of a housing of the storage device, where the surface retains a selected color without power. Some storage devices are display-less and/or do not have their own power supply. For example, universal serial bus (USB) thumb drives or direct attached storage (DAS) devices, such as Western Digital's Passport® portable external drives do not have displays and rely on a connected host device (e.g., computer or laptop) for power. As these devices do not have displays, they cannot provide status information using displays. Even if they had displays, without power, traditional liquid crystal display (LCD) screens or LEDs cannot be used. While some types of displays like E-ink displays do not require power to display a retained image, incorporating any type of display into the storage device adds additional costs that would make products uncompetitive for particular price points.

Thus, there is a benefit in being able to provide status information even when no power is available and without relying on a display. Electrochromic materials can control optical properties such as optical transmission, absorption, reflectance and/or emittance in a continual but reversible manner on application of voltage. For example, electrochromic materials are used for applications like smart glass and electrochromic mirrors. By incorporating the electrochromic material in the storage device housing, these devices can provide users information on their status (e.g., available storage) by changing color, while disconnected from the host system and without available power.

Electrochromic Materials

Electrochromism is a phenomenon where the color or opacity of a material changes with the application of voltage. The color change is persistent, and energy is only needed to cause a color change but not to retain the color. Electrochromic materials, also known as chromophores, affect the optical color or opacity of a surface when a voltage is applied. Electrochromic materials can include metal oxides such as tungsten oxide, molybdenum, titanium and niobium oxides. Some organic compounds, such as viologens, and some conducting polymers, such as polypyrrole, PEDOT polymer, and polyaniline, can also display electrochromic properties. Other types of synthetic materials can also be engineered to incorporate electrochromism.

There are many uses for materials with electrochromic properties. For example, in the automobile industry, electrochromic glass is used to automatically tint rear-view mirrors in various lighting conditions. In another example, electrochromic windows can block ultraviolet, visible or (near) infrared light. By blocking infrared light, the energy efficiency of an a structure or enclosure can be increased by reducing heat buildup in the enclosure.

In some embodiments, electrochromic materials are combined with other components into electrochromic devices (ECDs). ECDs control optical properties such as optical transmission, absorption, reflectance and/or emittance in a continual but reversible manner on application of voltage. An ECD can be used for applications like smart glass, electrochromic mirrors, and electrochromic display devices. In one embodiment, an ECD consists of two electrochromic (EC) layers separated by an electrolytic layer. Conducting electrodes on either side of both EC layers are used to provide an external voltage and effect a color change. For ease of explanation, the disclosure refers to electronic materials, which may refer to a single electrochromic layer, multiple layers, or electronic layers in combination with other components (e.g., ECDs).

Some electrochromic devices can be categorized into two types: a laminated ECD which uses a liquid gel, and solid electrolyte EC devices which uses solid inorganic or organic material. In one embodiment, the structure of the electrochromic device includes five superimposed layers on one substrate or positioned between two substrates in a laminated configuration. For example, the two outer layers may be transparent conductors, with the two middle layers being an EC layer and an ion-storage layer for conducting ions and electrons. The central layer may be electrolyte for separating the two middle layers. Optical absorption occurs when electrons move into the two middle layers from the transparent conductors along with charge balancing ions entering from the electrolyte in the central layer. Other electrochromic devices embodiments may use more or less layers.

Application in Storage Devices

Figure 1:
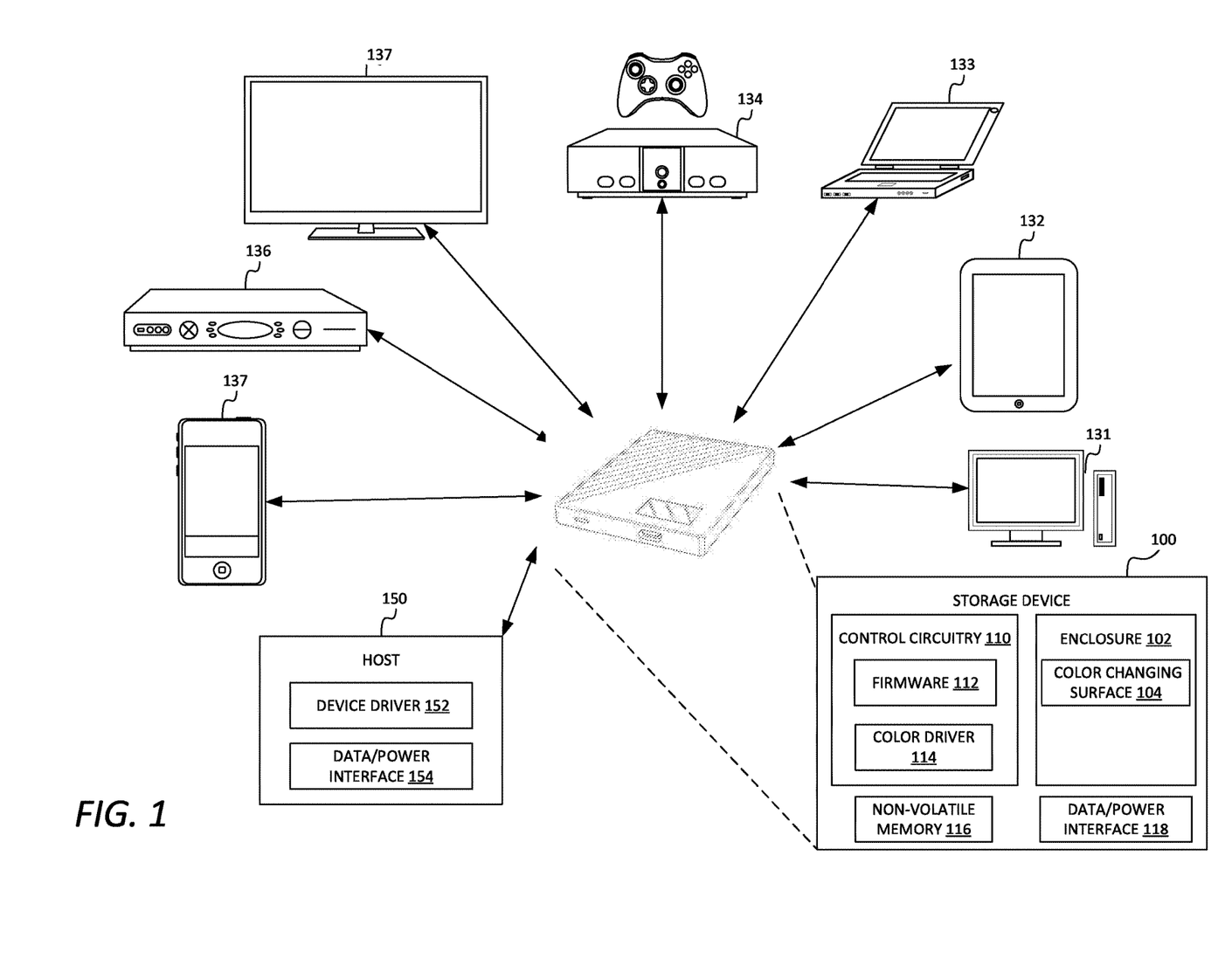
FIG. 1 is a diagram illustrating a storage device with a color changing surface communicatively coupled to one or more host devices, in accordance with some embodiments.

FIG. 1 is a diagram illustrating an embodiment of a storage device 100 with a color changing surface, in which the storage device 100 is communicatively coupled to one or more host devices. The storage device 100 may provide file-based or object-based data storage services to connected devices. Typically, the storage device 100 is connected to one host device at a time, though some embodiments may allow concurrent connections to multiple hosts. For example, some embodiments may have multiple connection ports or use a network interface. In a typical use case, the storage device 100 is physically connected to a port (e.g., USB or power over ethernet (PoE)) on the host device that allows data transfer and provides power to the storage device 100. In most embodiments, the storage device 100 does not have a display or a separate power source, so relies on the host device for power.

Some storage devices are designed to be put into a system. For example, solid-state-drives (SSDs) in the M.2 or 2.5" form factor and hard disk drives (HDDs) or solid state hybrid drives (SSHD) in a 2.5" or 3.5" form factor are designed to be put into servers, computers, laptops or the like. However, some storage devices are configured to run externally from a host system. For example, DAS devices are configured to be removably connected (e.g., through USB) to host systems and be easily disconnected. Many such devices typically lack a display and an independent power source, such as a battery or a power supply. Instead, such devices communicate and obtain power through the host. For example, such devices can send messages for display on a user interface of the host that is shown on a host's display screen. Such devices may also connect through an interface capable of providing power, as well as transfer of data, such as USB.

In some embodiments, the storage device 100 comprises an enclosure 102 having a color changing surface 104, control circuitry 110 for controlling operations of the storage device 100, non-volatile memory, and a data/power interface 118. Furthermore, the control circuitry 110 may be configured to run firmware 112 and a color driver 114.

The color changing surface 104 can include an electrochromic material to facilitate changes in color. By using the electrochromic material, the color change can be retained even without using power. The color change can include changes in transparency and/or in hue.

In some embodiments, the color changing surface 104 is a portion of the enclosure 102. For enclosures without displays, the color changing surface 104 can be used to indicate a status of the storage device 100. In some embodiments, a strip on a surface of the enclosure may comprise the color changing surface 104 while the remaining parts of the enclosure is made of a normal, non-changing material, such as ordinary polymer, plastic, and/or metal. Ordinary materials are typically lower cost than electrochemical materials, so the overall costs of the enclosure 102 is reduced by only having a portion of the enclosure include a color changing surface 104.

In some embodiments, the color changing surface 104 is made wholly of an electrochromic material or device. In some embodiments, the color changing surface 104 comprises the electrochromic material(s) in combination with other materials. In other embodiments, the surfaces of the enclosure may be wholly or mostly made of the color changing surface 104. For example, small devices such as USB memory sticks or flash drives may use a color changing surface 104 for the enclosure, except for possibly the USB connector, which requires a conductive material such as a metal. For those devices, the entire device can change color to reflect the available storage in the storage device.

The control circuitry 110 of the storage device 100 can include one or more central processing units (CPUs), controllers, memory, input/output interfaces, and/or the like. The control circuitry may be configured to execute certain software applications, drivers, or firmware for implementing the functionality described herein. In one embodiment, the control circuitry 110 is configured to run firmware 112 for the storage device and the color driver 114 for controlling the electrochromic material. In one embodiment, the color driver 114 may be part of the firmware 112. In some embodiments, the control circuitry includes a color surface interface, which may be software and/or hardware, for applying commands sent through the color driver 114 to the color changing surface 104. For example, the color surface interface may apply voltage through traces or other connecters to the color changing surface 104, thereby changing the color of the surface 104. In an embodiment, power from the host may be transferred from the data/power interface 118, through traces or other connecters that are activated in repose to commands from the control circuitry 110, to the color chaining surface 104.

In some embodiments, the firmware 112 includes a mapping of status (e.g., available storage) to color. For example, one potential mapping is as follows:

| AVAILABLE STORAGE | COLOR |
| --- | --- |
| 0-25% | Red |
| 26-50% | Amber |
| 51-75% | Yellow |
| 76-100% | Green |

As will be apparent, many other embodiments of the mapping are possible. For example, the ranges may be different, with some ranges being wider than other ranges. In another example, more than four color and ranges may be used. In some embodiments, there may be less ranges. For example, there may be only two colors used. The first color can be used to indicate when the available storage falls below a certain threshold, while the second color is used at all other times.

Other types of status could also be indicated on the color changing surface 104. For example, the health of the storage device 100 can be indicated. In one embodiment, the number of errors found on the storage device are mapped to colors, when, as the number of errors pass certain thresholds, a different color is selected. Many types of storage devices become more prone to failure or errors with age and use. The color changing surface 104 can provide users with an indication that the storage device 100 is getting closer to failure and should be replaced soon.

The storage device 100 can utilize various types of non-volatile memory 116 such as a HDD, NAND memory (e.g. SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. New types of emerging non-volatile memory could also be used such as Program in Place or Storage Class Memory (SCM) such as ReRam, PCM, and MRAM.

The types of host devices that may access the storage device 100 can include phones 137, such as smartphones, cable set-top boxes 136, smart TV's 135, video game consoles 134, laptop computers 133, tablet computers 132, desktop computers 131, wearable computers (not shown) and/or other network-connected computing devices. A representative host system 150 is shown in FIG. 1, the host system including a device driver 152 and a data and/or power interface 154.

The host system 150 can include the device driver 152 and the data/power interface 154 for communicating with the storage device 100 and providing it with power. Typically, the data and power interface 154 is combined into a single physical port, such as some form of USB port (e.g., USB-A, USB-B, USB-C, mini-USB, micro-USB, etc.), Thunderbolt port, PoE, or the like. However, some devices may have separate ports for data (e.g., eSATA, ethernet) and power. In some embodiments, a corresponding data and power interface 118 is found on the storage device 100.

In some embodiments, the storage device 100 communicates with the device driver 152 when connected to the host system 150. The storage device 100 can obtain information from the host system 150 through the device driver 152. Some information is more readily available at the host system 150 than at the storage device 100. For example, while file system data may be stored on the storage device 100, the storage device 100 typically does not make use of the file system data as the storage device 100 does not run a file system that can decode the file system data. Rather, the file system is running on the host system 150 and the storage device 100 can use the device driver 152 to obtain file system information from the host system 150, such as the number of files or the amount of available storage on the storage device 100.

While the above has described certain embodiments of the storage device 100 with a color changing surface 104, other embodiments are possible. For example, as new materials with similar characteristics to electrochromic materials are developed, those new materials could be substituted to provide the desired color change functionality that is retainable without electrical power. In addition, while the above has provided examples of DAS devices, such as USB sticks and USB drives, the color changing functionality can be added to other types of storage devices 100. For example, internal drives (e.g., SSD, HDD, SSHD, etc.) that are placed in custom computer cases with clear windows could use the color changing functionality for decorative purposes. In another embodiment, the color changing functionality could be added to a network attached storage (NAS) device without a display. Home NAS devices are typically in a low power state as they are used only sporadically. The color changing functionality can allow the user to easily see the status of the NAS drive (e.g., available storage) without requiring additional power to run status lights or other types of active indicators, such as LEDs.

Figure 2A:
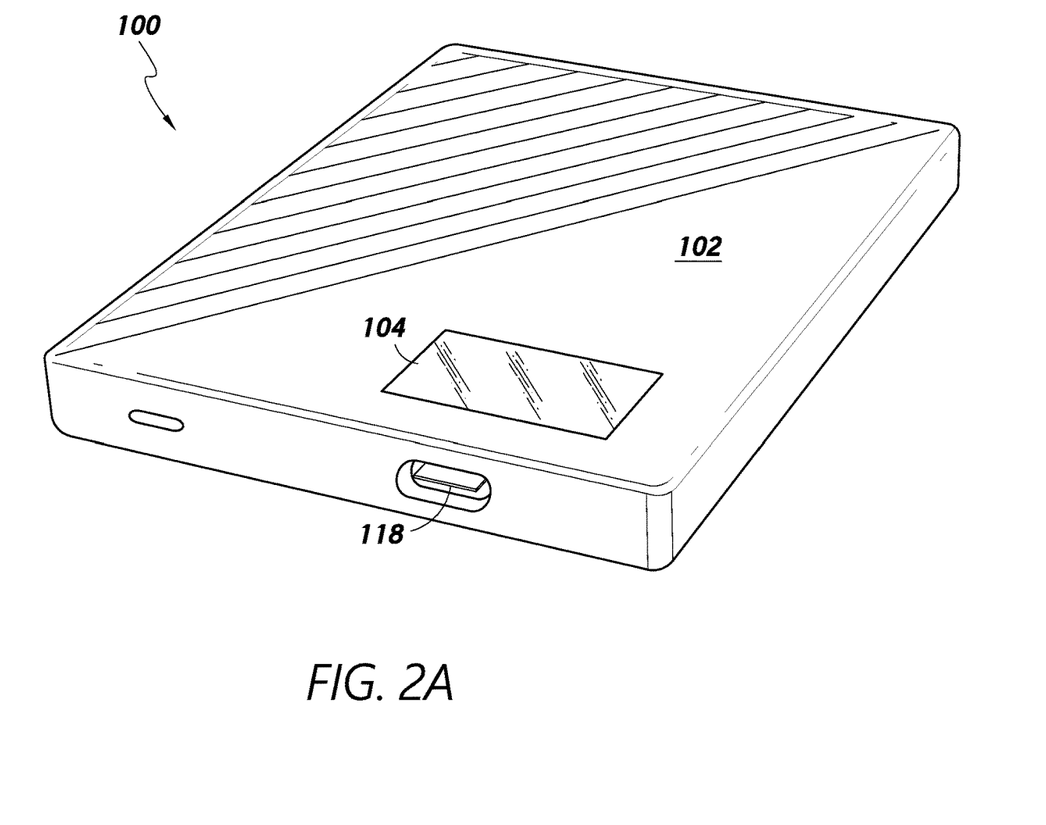
FIG. 2A illustrates a perspective view of an embodiment of the storage device having an enclosure with a color changing surface, in accordance with some embodiments.

FIG. 2A illustrates a perspective view of an embodiment of a storage device 100 having an enclosure 102 with a color changing surface 104. In the illustrated embodiment, the storage device 100 is a USB external drive where the data/power interface 118 is a USB connector for connecting to the host system. Inside the enclosure 102 may be an SSD, SSHD, or HDD drive for storing data. The USB external drive lacks its own power supply and a display. Instead, it obtains power through the USB connector when connected to the host system 150 (not shown).

As shown, the color changing surface 104 comprises a patch or band formed on one surface of the USB drive. In other embodiments, the color changing surface 104 may be larger. For example, color changing surface 104 may comprise one entire surface of the USB drive or the band may extend around multiple sides (or all four sides) of the USB drive.

Figure 2B:
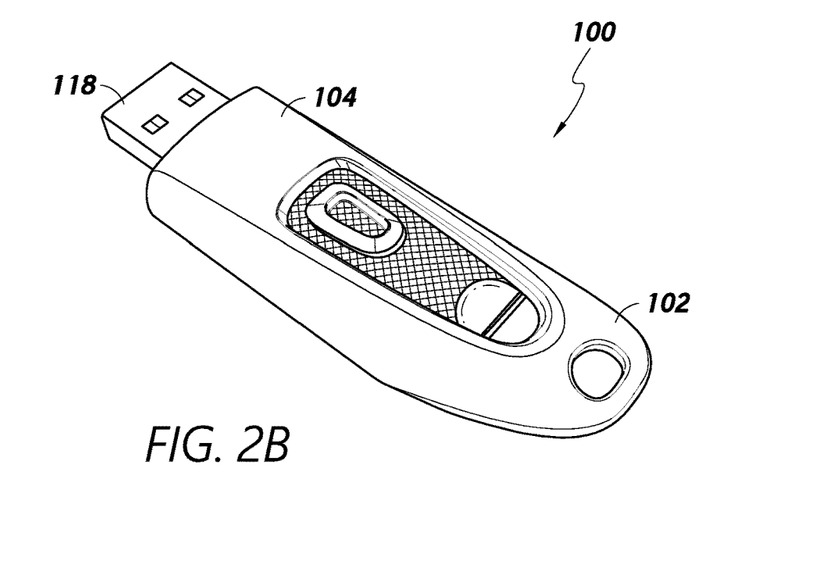
FIG. 2B illustrates a perspective view of another storage device with a color changing surface, in accordance with some embodiments.

FIG. 2B illustrates a perspective view of another embodiment of a storage device 100 having an enclosure 102 with a color changing surface 104. In the illustrated embodiment, the storage device 100 is a USB flash drive with a USB connector as a data/power interface 118 for connecting to the host system, where the color changing surface 104 is a large portion of a top surface of the enclosure. Inside the enclosure 102 are flash memory chips for storing data. Typically, USB flash drives use a significantly smaller form factor than USB external drives as they do not enclose a 2.5 inch or 3.5 inch form factor drive. The USB flash drive lacks its own power supply and a display. Instead, it obtains power through the USB connector when connected to the host system 150 (not shown).

As shown, the color changing surface 104 comprises an area formed on one surface of the USB drive. In other embodiments, the color changing surface 104 may be larger. For example, color changing surface 104 may comprise the entire enclosure of the USB flash drive or a top side or bottom side of the enclosure.

While FIGS. 2A and 2B have shown particular examples of storage devices, other form factors can be used. For example, connectors other than USB can be utilized. In another example, NAS devices can built with color changing surfaces.

Figure 3:
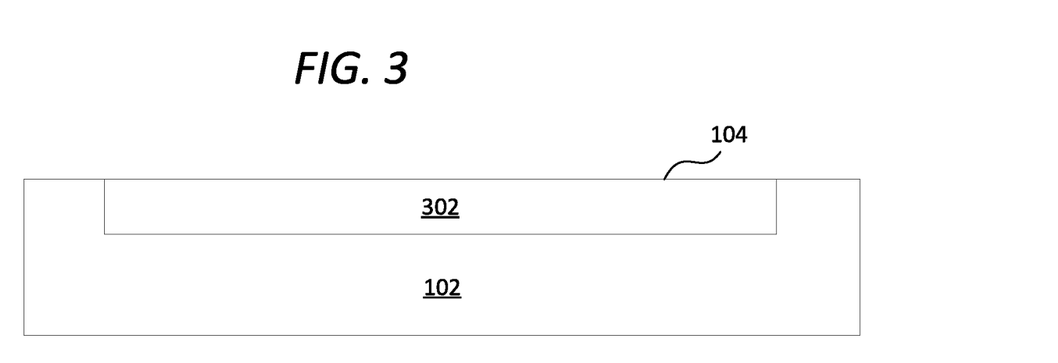
FIG. 3 illustrates a side cross section of an enclosure surface having a color changing surface, in accordance with some embodiments.

FIG. 3 illustrates a side cross section of a surface of a storage device enclosure 102 having the color changing surface 104. For example, the surface may be a top side or bottom side of the USB external drive of FIG. 2A. In the illustrated embodiment, the color changing surface comprises an electrochromic material 302 that can change in hue. Thus, the electrochromic material 302 may change to two or more different hues to denote the status of the storage device.

Figure 4A:
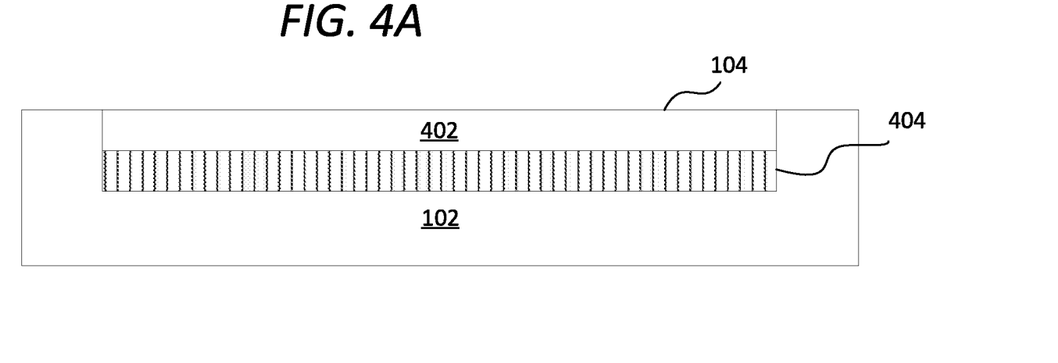
FIGS. 4A and 4B illustrates a widthwise cross section of another enclosure surface having a color changing surface, in accordance with some embodiments.
Figure 4B:
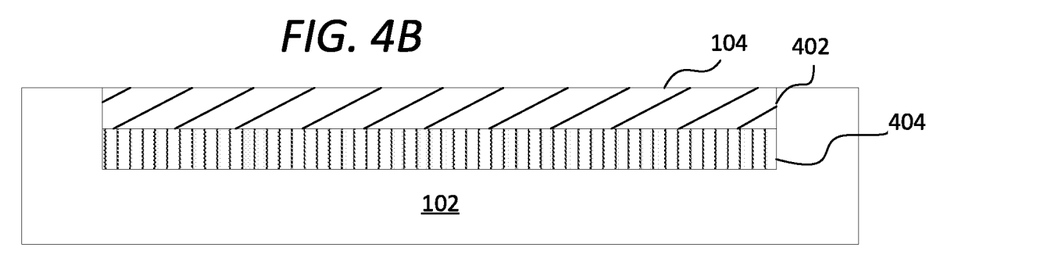

FIGS. 4A and 4B illustrate a side cross section of a surface of a storage device enclosure 102 having the color changing surface 104 using an electrochromic material 402 that changes transparency. For example, the surface may be a top side or bottom side of the USB external drive of FIG. 2A.

In the illustrated embodiment, the color changing surface comprises an electrochromic material 402 that can change in transparency. Some electrochromic materials can only change transparency rather than hue. Underneath the electrochromic material 402 is a colored layer 404 (e.g., red, blue, green, yellow, etc.) that denotes a particular status. By becoming transparent, a surface below the electrochromic material can be shown. By becoming opaque, the surface below can be covered. For example, the colored layer 404 may be red and the electrochromic material 402 becomes transparent to transform the color changing surface 104 to red by allowing the colored layer 404 to be seen.

FIG. 4A shows the electrochromic material 402 in a transparent state, allowing the colored layer 404 to be seen through the color changing surface 104. FIG. 4B shows the electrochromic material 402 in an opaque state, preventing the colored layer 404 from being seen. The color changing surface 104 may remain a default color of the electrochromic material 402, which in some embodiments may match the color of the enclosure 102.

Figure 5:
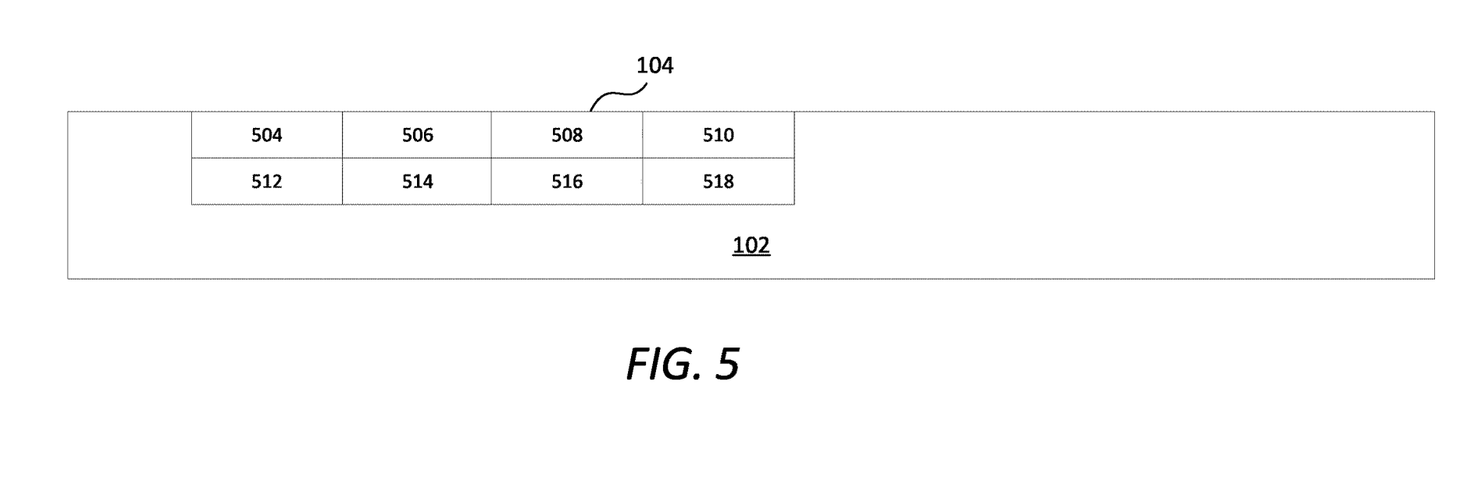
FIG. 5 illustrates a lengthwise cross section of an enclosure surface having a segmented color changing surface, in accordance with some embodiments.

FIG. 5 illustrates a lengthwise cross section of a surface of a storage device enclosure 102 having a segmented color changing surface 104 using bands of electrochromic materials 504, 506, 508, 510 that changes transparency. For example, the surface may be a top side or bottom side of the USB external drive of FIG. 2A.

Underneath the bands of electrochromic materials 504, 506, 508, 510 are colored bands 512, 514, 516, 518 that denotes a particular status. Each colored band can be a different color. Depending on the desired color, the corresponding electrochromic band will become transparent, while the other electrochromic bands remain opaque. For example, if the color band 512 corresponds to the current status (e.g., storage low), voltage is applied to electrochromic material band 504 to turn it transparent and show the colored band 512, while the remaining electrochromic bands 506, 508, 510 are kept opaque to hide the other colored bands.

While the above refers to electrochromic material, the electrochromic material is not necessarily a singular material and may contain other materials in addition to an electrochromic layer. In some embodiments, the electrochromic material may be an electrochromic device comprising of several layers that together provide the color changing capability.

Figure 6:
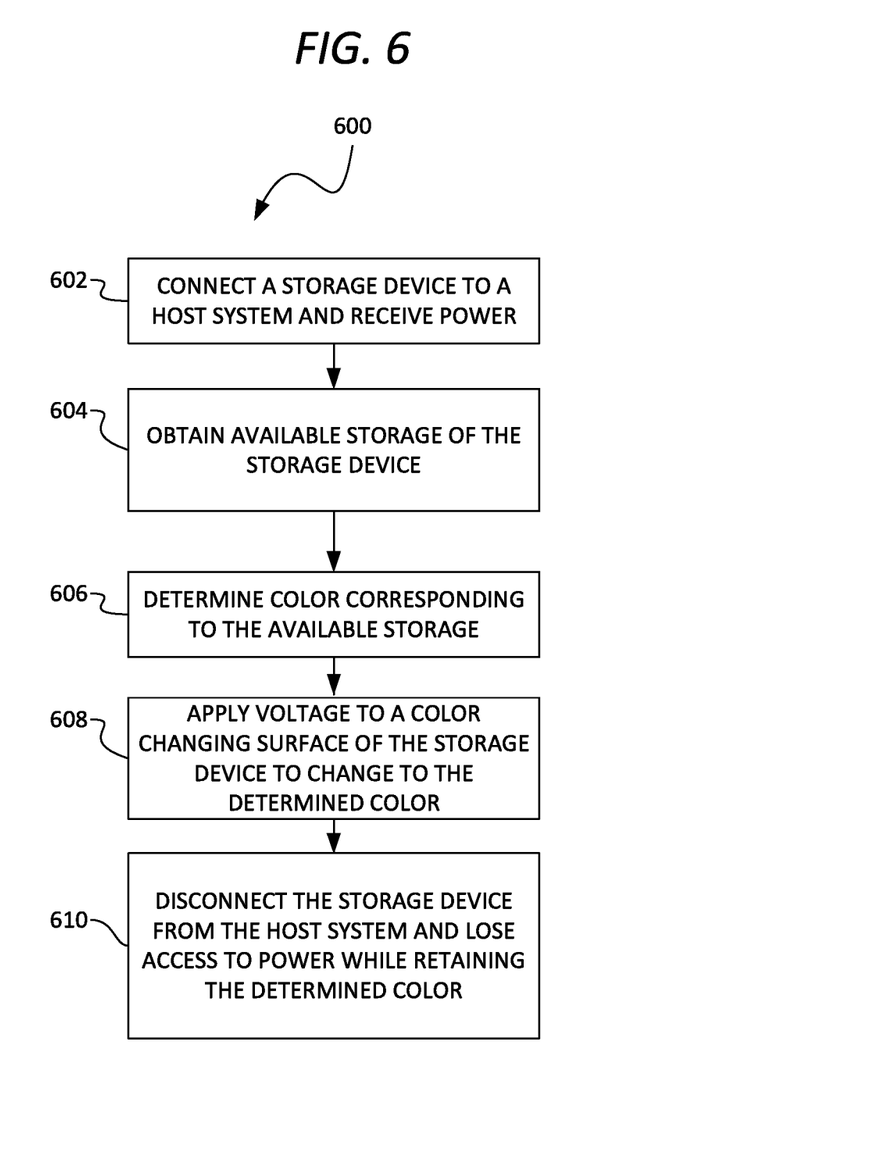
FIG. 6 illustrates a process for connecting the storage device to a host system, in accordance with some embodiments.

FIG. 6 illustrates a process 600 for connecting a storage device to host system. At least some of the steps of the process 600 may be implemented at least in part by the storage device 100 or its components, such as the control circuitry 110. For ease of explanation, the following refers to components described in FIG. 1. However, the process 600 is not limited to those components and other embodiments of the storage device 100 may use different components to run the process.

At block 602, the process begins by connecting a storage device 100 to a host system 150 and receiving power from the host system 150. As discussed above, some embodiments of the storage device 100 lack an independent power source and rely on the host system 150 for power.

At block 604, the storage device 100 obtains the available storage of the storage device. In some embodiments, the storage device 100 communicates with a device driver 152 on the host system 150 to obtain the available storage of the storage device. The device driver 152 can access a file system running on the host system to obtain the available storage information and can then provide that information to the storage device 100. Other status information of the storage device may also be obtained from the device driver 152, such as storage device health, data errors, etc.

In some embodiments, the storage device 100 comprises a monitoring system. For example, Self-Monitoring, Analysis and Reporting Technology (SMART) is a monitoring system that can be found in HDDs, SSDs, SSHDs, and embedded MultiMediaCard (eMMC) drives. SMART can detect and report various indicators of drive reliability in order to predict imminent hardware failures. The storage device 100 may obtain the available storage of the storage device from the monitoring system. For example, SMART includes an attribute for Total Logical Block Addresses (LBAs) Written. By taking the ratio of Total LBAs Written to total LBAs, the storage device 100 can determine the available storage of the storage device 100.

At block 606, the storage device 100 determines a color corresponding to the available storage. In some embodiments, the storage device 100 maintains a mapping of colors to ranges of available storage to determine the color. This mapping may be stored in the firmware 112 of the storage device or in another component of the storage device.

At block 608, the storage device applies a voltage to a color changing surface 104 of the storage device to change the color changing surface 104 to the determined color. As described above, the color changing surface 104 may be a portion of the enclosure 102 or the entire enclosure. For example, the color changing surface 104 may be a patch, a band or a side(s) of the enclosure.

In some embodiments, the color changing surface 104 comprises an electrochromic material capable of changing hues, as described in FIG. 3. In those embodiments, the color changing surface changes directly to the determined color. In some embodiments, the color changing surface 104 comprises an electrochromic material capable of changing transparency, as described in FIGS. 4A, 4B, and 5. In those embodiments, the electronic material or a portion of the material changes transparency to reveal the corresponding color embedded in the enclosure 102 under the electronic material. Other portions of the electronic material may become opaque to cover other colors. For example, the revealed color can change from green to red by having a first portion of the electronic material become opaque over the embedded green color while a second portion of the electronic material becomes transparent over the embedded red color.

At block 610, the storage device 100 is disconnected from the host system 150 and loses access to power from the host system. For example, the storage device 100 may be connected by a USB cable or USB connecter and is disconnected from a USB port on the host system 150. As power is no longer available, no further changes to the electrochromic material are possible. However, the determined color is still retained by the color changing surface 104.

Additional Embodiments

Those skilled in the art will appreciate that in some embodiments, other types of storage devices 100 with color changing surfaces systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A storage device comprising:
   a display-less enclosure comprising at least a color changing surface having an electrochromic material, the electrochromic material configured to change color in response to applying voltage;
   non-volatile memory configured to store data;
   memory configured to store firmware for operating the storage device; and
   control circuitry coupled to the memory, the control circuitry configured to:
      determine an available space in the non-volatile memory;
      determine a first color corresponding to the available space based on a mapping of ranges of available space to corresponding colors;
      apply a voltage to the electrochromic material to change the color changing surface to the first color; and
      cease application of the voltage to the electrochromic material, wherein the color changing surface retains the first color after cessation of the voltage.

2. The storage device of claim 1, further comprising:
   an interface for receiving power and transferring data, the interface configured to connect with a host system.

3. The storage device of claim 2, wherein the voltage applied to the electrochromic material is obtained from the host system via the interface.

4. The storage device of claim 2, wherein the interface comprises a universal serial bus (USB) port.

5. The storage device of claim 2, wherein the storage device does not have an independent power source and is configured to receive the power for applying the voltage to the electrochromic material from the host system.

6. The storage device of claim 2, wherein:
   the control circuitry is further configured to determine the available space in the non-volatile memory by querying the host system;
   the host system is configured to run a driver associated with the storage device; and
   the driver is configured to determine the available space from a file system of the host system and report the determined available space to the storage device.

7. The storage device of claim 1, wherein the electrochromic material is configured to change color from a substantially opaque state to a substantially transparent state in response to the application of the voltage.

8. The storage device of claim 7, wherein the substantially transparent state reveals a colored layer having the first color underneath the electrochromic material.

9. The storage device of claim 7, further comprising:
   a second electrochromic material; and
   a second colored layer underneath the second electrochromic material, the second colored layer corresponding to a second color denoting a different available space than the first color.

10. The storage device of claim 1, wherein the electrochromic material is configured to change color from the first color corresponding to a first range of available space to a second color corresponding to a second range of available space.

11. The storage device of claim 1, wherein the ranges of available space comprise at least four ranges from 0-100%, each range corresponding to a different color.

12. The storage device of claim 11, wherein:
    a first range is from 0-25% available space;
    a second range is from 26-50% available space;
    a third range is from 51-75% available space; and
    a fourth range is from 76-100% available space.

13. The storage device of claim 11, wherein:
    a first range is associated with a red color;
    a second range is associated with an amber color;
    a third range is associated with a yellow color; and
    a fourth range is associated with a green color.

14. The storage device of claim 1, wherein the control circuitry is further configured to determine the available space in the non-volatile memory by querying a monitoring system of the storage device tracking a number of written blocks in the non-volatile memory.

15. A method for indicating available space of a storage device using a display-less enclosure comprising at least a color changing surface having an electrochromic material, the method comprising:
    determining an available space in a non-volatile memory of the storage device;
    determining a first color corresponding to the available space based on a mapping of ranges of available space to corresponding colors;
    applying a voltage to the electrochromic material to change the color changing surface to the first color; and
    ceasing application of the voltage to the electrochromic material, wherein the color changing surface retains the first color after cessation of the voltage.

16. The method of claim 15, wherein determining the available space in the non-volatile memory comprises:
    communicating with a host via an interface of the storage device, the host configured to run a driver associated with the storage device; and
    obtaining, from the driver, an indication of the available space from a file system of the host.

17. The method of claim 15, wherein the electrochromic material is configured to change color from a substantially opaque state to a substantially transparent state in response to the application of the voltage.

18. The method of claim 15, wherein the electrochromic material is configured to change color from the first color corresponding to a first range of available space to a second color corresponding to a second range of available space.

19. The method of claim 15, wherein the storage device does not have an independent power source and is configured to receive power for applying the voltage to the electrochromic material from a host system.

20. A storage device comprising:
    a display-less enclosure comprising at least a color changing surface having an electrochromic material, the electrochromic material configured to change color in response to applying voltage;
    non-volatile memory configured to store data;
    memory configured to store firmware for operating the storage device;
    means for determining an available space in the non-volatile memory;

means for determining a first color corresponding to the available space based on a mapping of ranges of available space to corresponding colors; and means for applying a voltage to the electrochromic material to change the color changing surface to the first color, wherein the color changing surface retains the first color after cessation of the voltage.

\* \* \* \* \*